Figure 2:
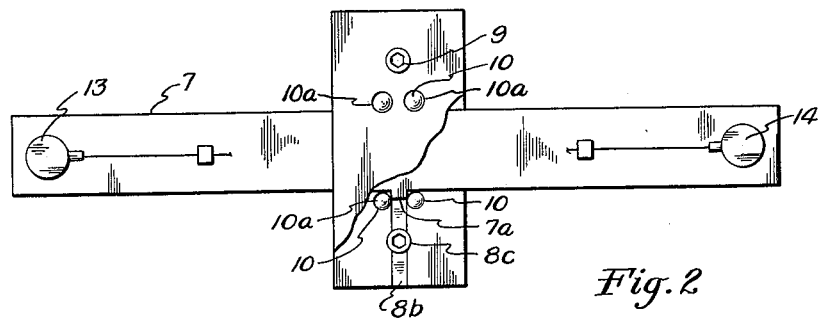

Nov. 1, 1960 T. A. PERLS ET AL 2,958,216
RESONANT-BEAM CALIBRATOR
Filed June 10, 1955

INVENTOR
*Thomas A. Perls*
*Charles W. Kissinger*

BY *Arthur Vinograd* ATTORNEY
*Leonard F. Stoll* AGENT

United States Patent Office 2,958,216
Patented Nov. 1, 1960

2,958,216

RESONANT-BEAM CALIBRATOR

Thomas A. Perls, Sherman Oaks, Calif., and Charles W. Kissinger, Arlington, Va., assignors to the United States of America as represented by the Secretary of Commerce Filed June 10, 1955, Ser. No. 514,796

1 Claim. (Cl. 73—1)

This invention relates to an apparatus for the calibration of accelerometers at high levels of acceleration. According to this invention the necessary high-level accelerations required for testing and calibrating are obtained by a resonant-beam system which is rigidly clamped to its driving source.

With the availability of accelerometers having ranges in thousands of $g$, it becomes important to provide satisfactory means for calibration particularly at high acceleration levels. In many types of tests and experimental investigations, such as projectile accelerations, explosive studies, accelerations due to direct hits from projectiles, transmissibility studies under high impact and shock-mount investigations, the acceleration ranges encountered are so high that it is important to ascertain the behavior characteristics of the particular accelerometer employed in the approximate range in which it is to be used. The calibration of such devices at acceleration levels commonly available in test equipment such as shake tables and similar devices does not offer any information concerning the accelerometer characteristics at the higher acceleration levels mentioned.

Prior efforts to obtain acceleration forces of sufficiently high magnitude to test and calibrate accelerometers and other instruments in their working range have been directed to the employment of transient calibration methods which involve impact techniques and devices such as the ballistic pendulum, air gun and inclined trough. See "Calibration of Accelerometers by Impact Techniques," by Conrad and Vigness, paper 53—11—3, Eighth National Conference of the ISA, September 1953. So far as is known, however, no satisfactory system is available for achieving steady state acceleration levels in the thousand $g$-range.

The use of an accelerometer calibrating device comprising a resonant beam which is freely suspended at predetermined nodal points and driven to resonance by an electromagnetic driving means has been described in an article by F. G. Tyzzer and H. C. Hardy entitled, "Accelerometer Calibration Technique," published in the Journal of the Acoustical Society of America, vol. 22, page 454 (July 1950). In this method, the resonant beam is vibrated as a free-free bar having 2 nodes, the bar being mechanically isolated from the driving source by employing a magnetic drive. According to such system, acceleration levels up to 400 $g$ are obtainable using 50-watt driving sources. By increasing the driving power employed, much higher amplitudes are obtainable according to such described method but rupture of the resonant beam within a few minutes of operation severely limits the efficcacy and utility of such system for practicable calibration work.

The present invention overcomes the difficulties encountered in the calibration system such as is described in the cited reference by employing a resonant bar which is rigidly clamped to the vibrating armature of a driving source. Steady-state accelerations as high as 400 $g$ (zero-to-peak) were thereby attained without damage to the resonant bar.

It is therefore an object of this invention to provide a testing and calibrating device capable of producing high-level acceleration forces.

Another object of this invention is to provide an apparatus and method capable of accurately calibrating accelerometers at high acceleration levels.

A further object of this invention lies in the attainment of high-level acceleration forces by employing a resonant-beam vibrating body which forms an integral part of the driving system.

Figure 1:
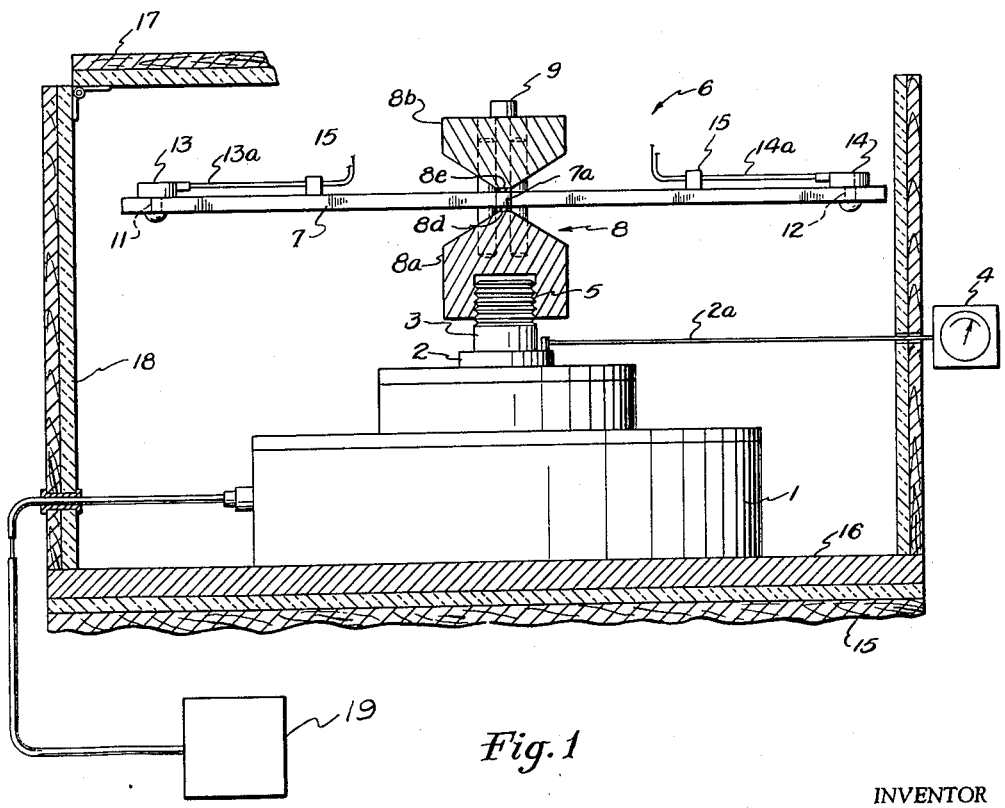

Further objects and advantages of the invention will become apparent upon reference to the specification and drawings in which:

Fig. 1 is a vertical elevation partly in section showing the resonant-beam calibration device as employed in a typical laboratory setup for calibrating an accelerometer, and Fig. 2 is a top view of part of the apparatus shown in Fig. 1.

A specific embodiment of a preferred form of the apparatus employed to obtain the above-described objectives is illustrated in Figs. 1 and 2.

As shown in Fig. 1 the apparatus employed in connection with the present invention comprises an electromagnet driving source 1 which may be an MB Type C31 vibration generator having a built-in velocity coil 2. Such vibration generator comprises an electromagnetically driven vibrating armature 3. The generator is driven from an external A.C. source 19 in the form of a variable frequency oscillator and amplifier of approximately 70-watt output capacity.

The reciprocable armature 3 of the vibration generator 1 includes a threaded portion 5 integral therewith serving as an anchoring means for a resonant-beam assembly 6. The beam assembly comprises a resonant bar 7 which is rigidly clamped to the armature 3 of the vibration generator preferably by means of a clamping jaw arrangement 8.

The lower clamping jaw 8a, as shown in Fig. 1 is rigidly secured to the armature 3 by means of the threaded connection 5 and thereby forms an integral part of the armature. As shown in Fig. 2, the lower jaw 8a is suitably tapped as indicated at 8c at opposed points to form a threaded recess for receiving clamping fasteners 9. The upper clamping jaw 8b is similar in shape and form to the lower jaw, and is provided with spaced bore holes in alignment with the described threaded recesses. The jaws are preferably made of a light, strong alloy such as 24–ST aluminum alloy.

As is apparent in the sectional view in Fig. 1, the clamping jaws are substantially V-shaped in cross section, the apex of each jaw being provided with a surface gripping flat 8d which is made of the smallest width possible consistent with the required degree of surface gripping action desired. It has been found that a width of approximately ⅛″ gives satisfactory results.

The resonant bar 7 is clamped between the jaws 8a and 8b as indicated in Figs. 1 and 2. Thin resilient layers 8e of Teflon, nylon, polyethylene or rubber are interposed between the bar and the jaws as shown in Fig. 1. The clamping fasteners 9—9 are disposed so as to straddle the bar as shown in Fig. 2 and a plurality of locating pins 10 are further provided in order to facilitate alignment of the bar. These pins are in the form of dowels which are embedded in the lower clamping jaw 8a. The upper jaw is drilled as indicated at 10a in Fig. 2 to provide recesses which register with the pins when the clamping jaws are in place. In order to prevent longitudinal displacement of the beam 7 with respect to the clamping jaws, the beam is provided with laterally projective abutments 7a which nest between adjacent pairs of locating pins 10 as shown in Figs. 1 and 2. In this manner the beam is integrally united to the armature of the vibrating system.

The velocity coil 2 which forms part of the described electrodynamic vibration generator is connected by leads 2a to an indicating device 4 which may be in the form of a sensitive vacuum-tube voltmeter such as a Hewlett-Packard type 400C. The voltage output as indicated by the meter is proportional to the velocity of the armature.

The resonant bar 7 consists of a fatigue-resistant chrome-vanadium steel (SAE 6145), which has been hardened by oil quenching at 1600° F., then tempered for approximately 1 hour at 1000° F., and air-cooled. Other materials which have been found satisfactory for the purpose are: Brown and Sharpe ground flat stock, SAE 10100, the same material hardened at 1500° F. and quenched in oil and then tempered at 1100° F. to approximately 38 Rockwell C hardness, and Red Streak Flat Ground Die Steel made by the Simonds Die and Steel Corporation.

To obtain the highest steady-state accelerations (4000 $g$) the width of the beam may be linearly tapered from the center toward each end. Such configuration has been found to result in increased magnification of the motion of the ends of the beam relative to its center and to the armature of the vibration generator from 4.5:1 for a rectangular shaped beam to 8.3:1. A beam shaped and mounted in the described manner was found to have a mechanical Q of about 165 (with less than 10% variation) in amplitude ranges up to plus or minus 3400 $g$. For the purposes of obtaining such figure of merit the equation $$Q = f/2\Delta f$$

where $f$ is the resonant frequency and $\Delta f$ is the change or variation in frequency from resonance required to reduce the vibration amplitude to 0.707 of its maximum value, was used.

The following table lists the physical dimensions and frequency characteristics of various types of beams employed as the resonant beams in the present invention.

Resonant beams having a geometrical configuration such as are exemplified in the table of beam characteristics will exhibit various nodal points when driven to resonance by the electrodynamic transducer 1.

According to classical nomenclature, the bar when rigidly clamped to the armature of the driver may be considered as a loaded free-free beam exhibiting two or more nodes depending upon the particular resonant frequency to which it is driven. In general, at higher frequency levels, the bar assumes a shape that conforms to a particular resonant frequency of operation. In other words, the bar will respond to several resonant frequencies depending upon the frequency of the driver source. At typical operating conditions such as those exemplified in the referred to table for example, the beam tends to flutter or exhibit a pattern of motion wherein the extremities of the beam arc upwardly as the armature 2 moves downwardly and vice versa. At higher frequencies of operation additional pairs of nodal points are manifested and the characteristic patterns exhibited by the beam become more complex.

Regardless of the nodal patterns exhibited, however, the use of a resonant beam which, in effect, forms an integral part of the driver source, results in the attainment of high order steady-state acceleration levels to a degree heretofore unobtainable in laboratory apparatus. While comparable high order acceleration levels have been obtained in transient test methods by the use of a ballistic pendulum, air gun etc., the present invention offers a means for securing such necessary degree of acceleration force for definite, practicable periods in a simple and economical manner.

In operation, the driving voltage for the vibration generator is adjusted in frequency to correspond to the fundamental mechanical resonance of the system consisting of the bar 7 and its loads, namely the clamping means 8, the armature of the vibration generator and the test accelerometers 13 and 14. Under such conditions of operation, the nodes will assume symmetrical positions somewhere between the clamping point and the ends of the bar, depending upon the shape of the bar and the relative masses of the bar and its loads.

*Tabulation of characteristics of resonant beams*

| Beam Dimensions (inches) | | | Approximate Resonant Frequency (c.p.s.) | Approx. Max. Steady-State Acceleration ($g$, zero-to-peak) | Clamping Holes |
|---|---|---|---|---|---|
| Length | Width | Thickness | | | |
| 8 | 2 | .5 | 1,030 | 900 | 1.5 in. apart, centered lengthwise. |
| 4 | 2 | .25 | 2,130 | 1,200 | Do. |
| 6 | 2 | .25 | 958 | 1,500 | Do. |
| 6 | ¹ 2 to .62 | .25 | 1,260 to 1,320, unstable | 1,400 | Do. |
| 8 | 1.75 | .25 | 570 | 2,200 | none.³ |
| 8 | ² 1.75 to .62 | .25 | 695 | 4,000 | none.³ |

¹ Tapered section extends over 2¼ inches from each end.
² Tapers extend over entire half of beam, from edges of centering stub to the ends.
³ Centering stubs ⅛ x ⅛, at center of beam, are held by steel pins in clamps.

The beam is further provided with mounting recesses 11, 12 at each end to facilitate attachment of the accelerometers 13, 14 to be tested or calibrated.

The electromagnetic driver and resonant-beam assembly is preferably mounted within a sound-proofed container 15. As shown in Fig. 1, a layer of sound-deadening felt 16 is interposed between the bottom of the box and the base of the transducer and the entire inside of the container including the lid 17 is lined with a sound-deadening material such as the acoustic tile shown as 18.

When the accelerometers are fastened in place in the described positions on the resonant beam, the accelerometer leads 13a, 14a are carefully brought inwardly toward the center of the beam and fastened by tape or suitable fasteners 15—15 as shown, and are brought out at the nodes of the beam to minimize whipping.

Since, in the described construction the armature of the vibration generator forms part of the resonant system, its amplitude of motion at resonance is proportional to the amplitude displacements exhibited by the ends of the bar 7. In a test procedure, the vibration generator 1 is driven at a very low frequency (40 c.p.s.) compared to the resonance of the bar so that the entire moving assembly (armature 3, beam 7, and accelerometer 13, 14) move as a rigid body. By securing a self-calibrating "chatter" or Bragg type accelerometer to the upper clamping block 3b, the sensitivity of the test accelerometer 13, 14 is determined for the lower acceleration levels from ±2 $g$ to ±10 $g$, with an accuracy of ±1%.

The moving system is then driven at its resonant frequency and at low amplitude, starting at ±6 $g$, and the output voltages of the velocity coil 2, and of the reference and test accelerometers are measured. From the previously described sensitivity determination of the accelerometer under test at low acceleration levels, a corresponding low-amplitude, resonant-condition calibration of the velocity coil 2 and reference accelerometer is obtained which can be expressed in millivolts from velocity coil per unit acceleration at the test accelerometer. These calibrations are, of course, applicable only to one particular beam and frequency. If the velocity coil 2 has a linear output, on the basis of the above calibrations, it is merely necessary to read the velocity coil output in order to ascertain the magnitude of subsequent higher acceleration levels to which the test accelerometer is driven.

It will be apparent that the embodiments shown are only exemplary and that various modifications can be made in construction and arrangement within the scope of invention as defined in the appended claim.

What is claimed is:

In a device for producing a high-level accelerations for testing and calibration purposes: a resonant structure having a selected resonant frequency comprising a free-free beam having a physical geometry such as to exhibit nodal points when driven to resonance, a movable armature rigidly connected to said beam at substantially the center and positioned to support said beam in space, testing means positioned near at least one end of said beam; electromagnetic driving means associated with said armature; and means for applying a frequency corresponding to said resonant frequency to said electromagnetic driving means.

References Cited in the file of this patent

UNITED STATES PATENTS

| | | |
|---|---|---|
| 2,102,614 | Couch | Dec. 21, 1937 |
| 2,220,164 | List | Nov. 5, 1940 |
| 2,706,400 | Unholtz | Apr. 19, 1955 |
| 2,782,633 | Strauss et al. | Feb. 26, 1957 |

FOREIGN PATENTS

| | | |
|---|---|---|
| 655,254 | Great Britain | July 18, 1951 |

OTHER REFERENCES

Resonance-Type Vibration Calibrator N.B.S. Technical News Bulletin, May 1953, pages 78–79. (Copy in 73–67.)

"Vibration Testing of Airplanes," by Wilson, Electronics, March 1949, pages 86–91. (Copy in 73–67.)

"Test Techniques Using Electro-Dynamic Shaker" by R. C. Lewis, reprint from Product Engineering, Jan. 1951, 7 pgs. (Copy in 73–71.6.)

Publication, Journal Acoustical Soc. Am., vol. 22 No. 4, July 1950, "Accelerometer Calibration Technique" by Tyzzer et al., pgs. 454–457.